Nov. 10, 1959　　　A. V. WEASLER　　　2,911,803
FREE WHEELING GUARD FOR A TELESCOPIC SHAFT
Filed March 14, 1955
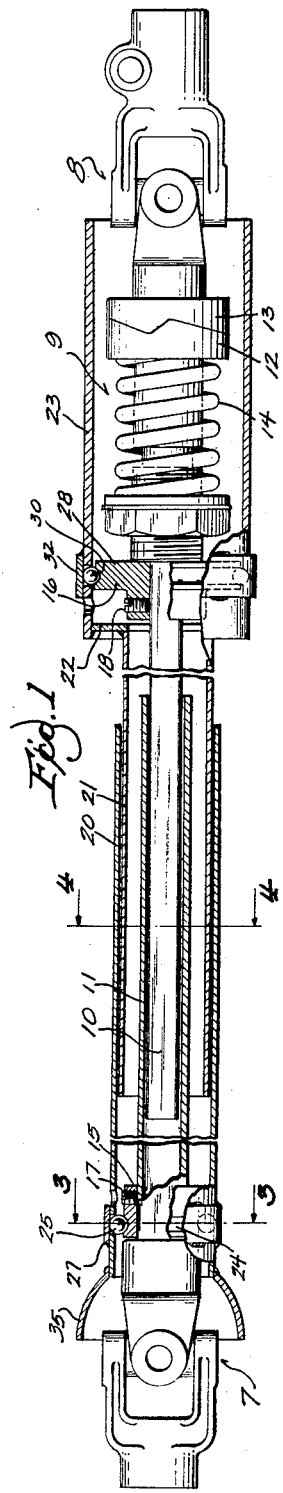
INVENTOR.
ANTHONY V. WEASLER
BY
Wheeler, Wheeler & Wheeler
ATTORNEYS United States Patent Office
2,911,803
Patented Nov. 10, 1959

2,911,803

FREE WHEELING GUARD FOR A TELESCOPIC SHAFT

Anthony V. Weasler, West Bend, Wis.

Application March 14, 1955, Serial No. 494,158

4 Claims. (Cl. 64—4)

This invention relates to a free wheeling guard for a telescopic shaft such as is used between spaced universal joints, and elsewhere. In a preferred embodiment, the guard extends to protect users from contact with an overload clutch incorporated in the protected shaft.

A major object of the invention is to make it possible to equip existing shafts with protecting guards. To this end, I have provided guard means comprising telescopically related parts applicable to the respective shaft, the means applying each guard to its shaft including a collar which may be slipped into position over the existing shaft and may be secured in place thereon. The disclosed means of fastening the collars includes the provision of set screws in the collars and openings in the guards which may be registered with the set screws to permit manipulation thereof.

For use with shafts having overload clutches, one of the telescopic guard members includes a sleeve which extends across the overload clutch thus protecting the user from contact with it, also. In such a case, the mounting collar may be disposed in the extension sleeve.

In the drawings:

Fig. 1 is a view in axial section of a guarded shaft assembly incorporating the invention.

Fig. 2 is a view in axial section showing the guard organization per se.

Fig. 3 is a detail view on an enlarged scale taken in section on the line 3—3 of Fig. 1.

Fig. 4 is a detail view on an enlarged scale taken in section on the line 4—4 of Fig. 1.

Fig. 5 is a rear view partially in side elevation and partially in section showing a modified embodiment of the invention.

Fig. 6 is a view similar to Fig. 5 showing a further modified embodiment.

The shaft assembly comprises universal joints at 7 and 8, an overload clutch assembly 9 of conventional design which connects universal joint 8 with the internal shaft element 10 of a telescopic shaft section, the sleeve shaft 11 of which is connected with the universal joint 7. While the slip clutch forms no part of the present invention, it may be explained briefly that it comprises a pair of cam disks 12 and 13 which are urged into engagement by a compression spring 14. Motion is communicated through the jaws unless the torque becomes sufficient to cam the disks 12 and 13 apart against compression of spring 14. If this condition arises, the disks 12 and 13 slip angularly to relieve the torque.

It is well known that exposed universal joints and telescopic shafts and slip clutches are dangerous to persons who may chance to contact them. In accordance with the present invention, a guard is provided which includes at least two collars 15 and 16 applicable to rotating portions of the shaft organization and provided with set screws at 17, 18 for maintaining them in place. Each collar is encircled by a guard tube. Inasmuch as the shaft element in the organization disclosed includes telescopically related sections, the tube members associated with the respective collars may also be telescopically related. There is one tube at 20 which encircles collar 15 and another tube at 21 which encircles shaft section 10 and is connected by the annular flange 22 with a sleeve 23 that encircles collar 16. Bearing means is provided whereby the several tubes or sleeves comprising the gap will stop their rotation upon contact, without in any way interfering with the continued rotation of the shaft elements therewithin.

In the preferred construction of the device as disclosed, each of the collars is provided on its external periphery with an annular channel constituting a ball race. In the case of collar 15, the ball race channel 24 is formed directly on the periphery of the collar. As shown in Fig. 3, the balls 25 are spaced about the collar and confined in openings 26 formed directly in the guard tube 20, whereby the latter serves as a cage. The balls are retained against loss in an outward direction through the positioning openings 26 by means of an external ball-confining race 27 which may be welded to the guard tube 20 in the manner shown in Fig. 1 and Fig. 2.

In the case of the collar 16, because of the large diameter of the guard tube 23, a radial flange is provided at 28 upon the collar and a ball race channel 29 is provided on the outer periphery of the flange 28. Balls 30 are disposed in apertures of the guard tube 23 and retained in such apertures by a race 32 welded externally to the tube 23, as best shown in Fig. 1 and Fig. 2, the general organization being the same as already described in connection with collar 15.

The respective collars are made to slide axially over the shaft elements to which they are applied and, upon reaching the desired positions, they are secured to the shaft elements by means of the set screws 17, 18 for which guard tubes 20 and 23 are provided with access ports at 33, 34. The entire guard assembly can be completed as shown in Fig. 2 and sold as a unit for application in this manner to existing shaft and joint structures such as the one to which the guard organization has been applied in Fig. 1.

The joints at the ends of the telescopic shaft element may be protected by any desired extension of the guard tube. In Fig. 1, I have shown a bell-shaped housing 35 welded to the end of tube 20 to partially encircle the universal joint at 7. The length of the tube 23 which guards the overload clutch is such that this tube extends partially about the universal joint at 8.

Instead of the specific ball-retaining means above described, I may weld housing 35 and the collar 27 on to the guard tube 20 with a single weld as shown at 37 in Fig. 5, the sleeve 270 being slightly elongated for this purpose. Or, I may weld the bell housing 35 to a still longer sleeve 271, as shown in Fig. 6, the latter sleeve then being welded at 38 to the guard tube 20.

It is believed to be advantageous to be able to supply the entire guard organization unitarily so that it can be conveniently used on old shaft organizations as well as upon new devices. In addition to the fact that the collars 15 and 16 make this possible, these collars also permit provision of hard ball race surfaces which have long life under conditions of actual service. Moreover, the use of the ball bearings permits relative movement between the guard tube and the shaft sections with the greatest of freedom so that a person inadvertently contacting a guard tube rotating with its shaft would only have to overcome the momentum of the guard tube in order to bring it completely to rest, there being little or no drag to be overcome.

I claim:

1. For use with telescopically associated shaft sections for guarding thereof, a guard organization comprising in unitary assembly a pair of telescopically associated guard tubes, collars disposed within each of the tubes upon which the tubes have relatively rotatable bearings, means for positioning the collars upon respective shaft sections to which they may be applied each said tube having an extension beyond its respective collar, the extension of one of said tubes being of materially greater diameter than the other tube and the collar disposed within the larger extension having an annular flange providing said bearing.

2. In combination, an extension shaft comprising telescopic sections, an overload clutch comprising elements angularly yieldable under excessive torque, bearing collars mounted on respective sections adjacent one of said elements, and guard tube means housing said sections and elements and having bearing support on said collars.

3. The device of claim 2 in which the bearing collars have anti-friction bearing races, the tube means comprises cage portions, outer race sleeves encircling said portions, and anti-friction bearings between said races.

4. For use with telescopically associated shaft sections and an adjacent overload clutch, a guard organization comprising in unitary assembly a pair of telescopically associated guard tubes, an extension tube of materially larger cross section than either guard tube and having means mounting it on and fixedly connecting it with one of the first mentioned tubes for the enclosure of an overload clutch, the extension tube having openings in peripheral series adjacent the end of the guard tube upon which it is mounted, a bearing race sleeve upon the extension tube covering said openings, bearing balls in the openings, a collar registering with the guard tube upon which the extension tube is mounted and provided with a set screw, said collar having a radial flange peripherally grooved and constituting an inner race with which said balls are engaged, said extension tube having an aperture positioned for radial alignment with said set screw and through which the set screw is accessible, the other of said telescopically associated guard tubes being provided at its end remote from said extension tube with a peripheral series of apertures and an encircling cage ring covering said apertures, ball bearings in the last mentioned apertures, and a collar within the last mentioned aperture and provided with a peripheral groove constituting a race with which last mentioned ball bearings are engaged to support them in the last mentioned apertures, the unitary assembly being unitarily adapted to be mounted on, and removed from existing associated telescopic shaft sections, one of which has an overload clutch connected with it, the first mentioned collar being engageable with one such shaft section adjacent to the overload clutch.

References Cited in the file of this patent
UNITED STATES PATENTS

| | | |
|---|---|---|
| 1,999,841 | MacGregor | Apr. 30, 1935 |
| 2,390,908 | Young | Dec. 11, 1945 |
| 2,553,337 | Shafer | May 15, 1951 |
| 2,785,549 | Harrington | Mar. 19, 1957 |

FOREIGN PATENTS

| | | |
|---|---|---|
| 23,051 | Great Britain | 1906 |

OTHER REFERENCES

"Instructions and Part List for Universal Joints L-924," published February 1950 by John Bean, Division of Food Machinery and Chemical Corporation, Lansing 4, Mich.